United States Patent
Hsu et al.

(10) Patent No.: US 11,966,309 B2
(45) Date of Patent: Apr. 23, 2024

(54) SATURATION OF MULTIPLE PCIE SLOTS IN A SERVER BY MULTIPLE PORTS IN A SINGLE TEST CARD

(71) Applicant: Hewlett Packard Enterprise Development LP, Houston, TX (US)

(72) Inventors: Hong-Jen Hsu, New Taipei (TW); Chih-Kang Lin, Taipei (TW)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/854,609

(22) Filed: Jun. 30, 2022

(65) Prior Publication Data

US 2024/0004769 A1  Jan. 4, 2024

(51) Int. Cl.
  *G06F 11/00*  (2006.01)
  *G06F 11/22*  (2006.01)
  *G06F 11/263*  (2006.01)
  *G06F 11/273*  (2006.01)

(52) U.S. Cl.
  CPC ........ *G06F 11/263* (2013.01); *G06F 11/2221* (2013.01); *G06F 11/2733* (2013.01)

(58) Field of Classification Search
  CPC . G06F 11/263; G06F 11/2221; G06F 11/2733
  See application file for complete search history.

(56) References Cited

U.S. PATENT DOCUMENTS

| | | | | |
|---|---|---|---|---|
| 6,289,293 B1 * | 9/2001 | Huang | ................ | G06F 11/2221 714/724 |
| 8,185,877 B1 * | 5/2012 | Colcord | ................... | G06F 9/44 717/124 |
| 10,678,721 B1 * | 6/2020 | BeSerra | ................ | G06F 13/102 |
| 2009/0313512 A1 * | 12/2009 | Jing | ...................... | G06F 11/263 714/719 |
| 2014/0013024 A1 * | 1/2014 | Lamm | .................... | H01R 31/06 710/313 |
| 2017/0337069 A1 * | 11/2017 | Huang | ................ | G06F 13/4282 |
| 2021/0405108 A1 * | 12/2021 | Strickling | .......... | G01R 31/2808 |
| 2023/0018476 A1 * | 1/2023 | Soumpholphakdy | ...................... | G11C 29/50004 |

FOREIGN PATENT DOCUMENTS

| | | |
|---|---|---|
| CN | 102043748 A | 5/2011 |
| CN | 211505789 U | 9/2020 |

* cited by examiner

*Primary Examiner* — Joseph D Manoskey
(74) *Attorney, Agent, or Firm* — Yao Legal Services, Inc.

(57) ABSTRACT

One aspect provides a method and system for saturation of multiple I/O slots by multiple testing ports and verification of link health in between. During operation, the system detects a testing card with a plurality of test ports which are coupled to a plurality of input/output (I/O) slots of a computing device. The system communicates with the plurality of test ports via the plurality of I/O slots. The system generates, by the computing device, a script for each test port, wherein the script comprises a series of read and write operations to be executed by the testing card on a memory device associated with the computing device. The system allows the plurality of test ports to execute the script and perform the corresponding read operations and write operations, thereby facilitating testing of the I/O slots of the computing device in parallel by the test ports of the single testing card.

20 Claims, 8 Drawing Sheets

| Slot | MB/Sec (W) (R) | %Bwdth (W) (R) | Link Status | MemAddr |
|---|---|---|---|---|
| 02 | 25310 | 79 | <status_02> | 0001 |
| 05 | 12520 | 78 | <status_05> | 0025 |
| 06 | 12510 | 78 | <status_06> | 0040 |
| 09 | 13300 | 83 | <status_09> | 0050 |
| 10 | 13310 | 85 | <status_10> | 0001 |

Link Recovery Count: 02:2; 05:2; 07:2; 08:2; 10:2
Script Name PBName_v1.12
Total I/O Speed is 76950 MB/Sec

FIG. 6B

SATURATION OF MULTIPLE PCIE SLOTS IN A SERVER BY MULTIPLE PORTS IN A SINGLE TEST CARD

BACKGROUND

Field

A computing device with multiple peripheral component interconnect express (PCIe) slots may need testing in order to verify various features of a given PCIe slot, including the latency, bandwidth, and stability of the given PCIe slot. PCIe test cards may be used to diagnose, troubleshoot, and load test the PCIe input/output (I/O) functionality of the computing device. A current configuration for a PCIe test card includes a switch with multiple ports, where only a single port on the test card is used to saturate one of multiple PCIe slots on a computing device, such as a server. Thus, because only the one single port on the test card is used, the other ports on the test card remain unused. Furthermore, one PCIe test card per PCIe slot must be used in order to perform testing on the multiple PCIe slots of the server.

BRIEF DESCRIPTION OF THE FIGURES

FIG. 6B presents a screen displayed as part of a user interface flow, in accordance with an aspect of the present application.

In the figures, like reference numerals refer to the same figure elements.

DETAILED DESCRIPTION

Figure 1:
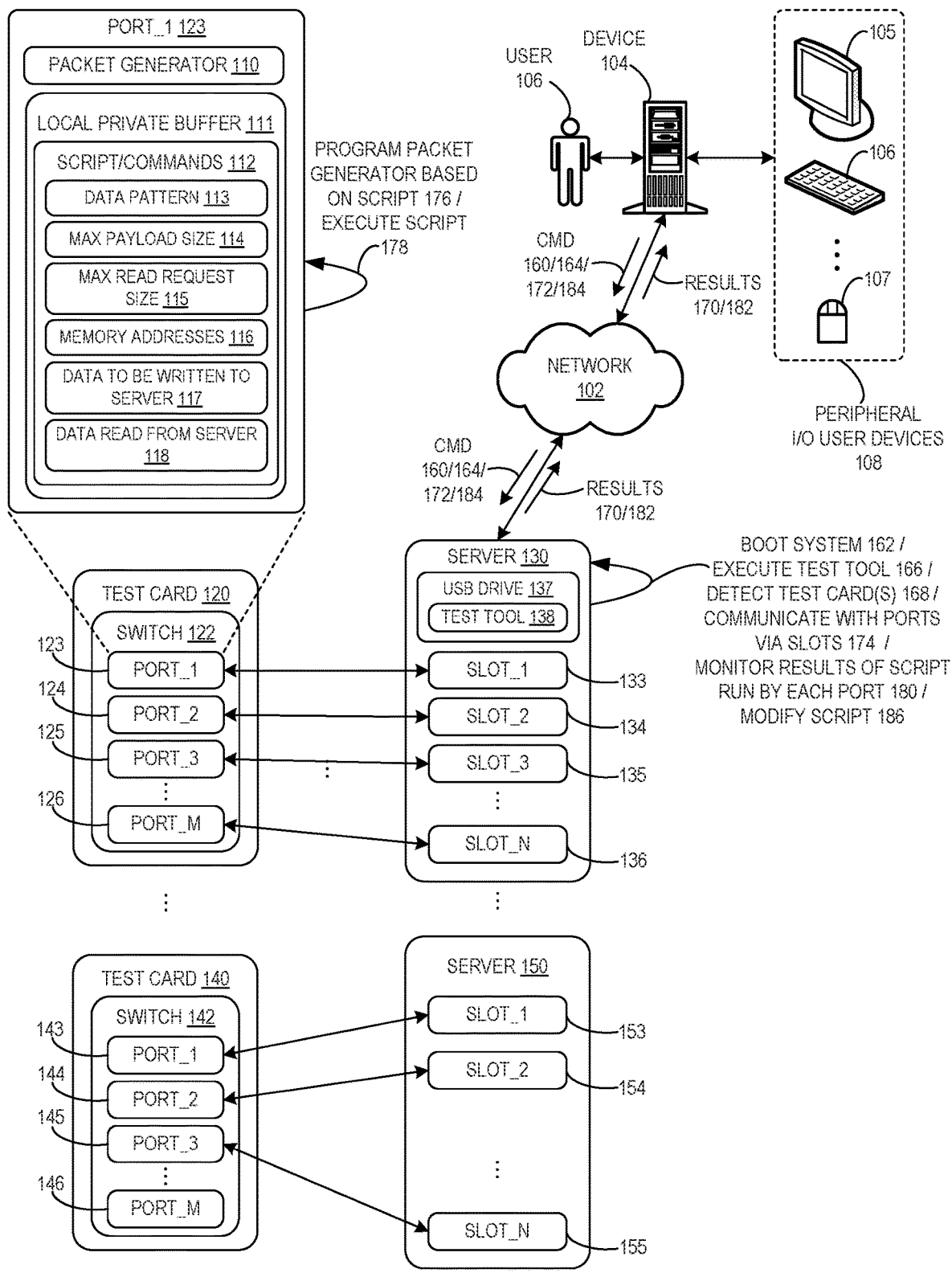
FIG. 1 illustrates a network environment in which a single PCIe test card is used to test multiple PCIe slots, in accordance with an aspect of the present application.

The following description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

A computing device with multiple PCIe slots may need testing in order to verify various features of a given PCIe slot, including the latency, bandwidth, and stability of the given PCIe slot. PCIe test cards may be used to diagnose, troubleshoot, and load test the PCIe input/output (I/O) functionality of the computing device. In this disclosure, a test card or a PCIe test card can include a "switch" which includes a plurality of "ports," as depicted below in relation to FIG. 1. That is, a current configuration for a PCIe test card includes a switch with multiple ports. On a computing device (e.g., a server) with multiple PCIe slots, current testing methodologies allow for one PCIe test card to be inserted into each slot (via PCIe goldfingers), where only a single port on a given PCIe test card (or switch) is used to saturate one of the multiple PCIe slots on the computing device. Thus, because only the one single port on the given test card is used, the other ports on the given test card remain unused. Furthermore, one PCIe test card per PCIe slot (i.e., multiple PCIe test cards) must be used in order to perform testing on all of the multiple PCIe slots of the server.

Assume a number M of ports on the PCIe test card and a number N of PCIe slots on the server, where in general, M is greater than or equal to N, i.e., the number of ports on the PCIe test card is generally greater than or equal to the number of PCIe slots on a server. For example, a Gen5 PCIe switch on a given test card can have M=10 ports, while older servers may have N=3 PCIe slots and newer servers may have N=[5 . . . 10] PCIe slots. This can result in using N total PCIe test cards in order to perform testing for each of the N PCIe slots, and because only one port of the M ports is used on each of the N total PCIe test cards, on each of the N PCIe test cards, M−1 ports remain unused, as described below in relation to FIG. 2. This can result in an inefficient use of both components and power consumption associated with each PCIe test card.

Aspects of the instant application provide a system which addresses the inefficient use of current testing methodologies. In the described aspects, only one PCIe test card is needed to perform testing on multiple PCIe slots of a server. Instead of using PCIe goldfinger connections of multiple test cards to multiple PCIe slots (i.e., one test card per slot), the described aspects can provide a connection or a coupling between some or all of the M ports of a single PCIe test card to all of the N PCIe slots on the server, as described below in relation to FIG. 3. This connection or coupling can be via customized PCIe cables, such as a Y-type cable or separate cables, as described below in relation to FIGS. 4 and 5. Such a configuration can allow the system to use one single PCIe test card, instead of N total PCIe test cards, to perform testing on the N PCIe slots of the server.

Thus, by reducing the number of PCIe test cards from N to 1, and by reducing the amount of power consumed as the number of PCIe test cards (and corresponding switches on the PCIe test cards) decreases from N to 1, the described aspects can result in a more efficient system and method for performing testing on PCIe slots of a server.

The term "server" is used in this disclosure to refer to a computing device, network entity, or other device. A server can include a plurality of slots. The term "slot" is used in this disclosure to refer to a dock for a printed circuit board or expansion card or other I/O-related circuitry. The terms "slot" and "I/O slot" are used interchangeably in this disclosure. An example of a slot or an I/O slot is a Peripheral Component Interconnect Express (PCIe) slot. PCIe cards or other PCIe components may be inserted into a "PCIe slot" on a server. PCIe slots, cards, and components may use an industry-standard high-speed computer bus architecture.

The term "test card" is used in this disclosure to refer to a card that can be coupled to, connected to, or inserted in a slot of a server in order to perform testing of the slot. The terms "test card" and "PCIe test card" are used interchangeably in this disclosure, where a PCIe test card can be coupled to, connected to, or inserted in a PCIe slot of a server in order to perform testing of the PCIe slot, which can include verifying various features of the PCIe slot, including the latency, bandwidth, and stability of the PCIe slot. In this disclosure, a test card or a PCIe test card can include a "switch," and the term "ports of a test card" may be used interchangeably with the term "ports of a switch."

The term "script" is used in this disclosure to refer to a set or sequence of instructions or commands, which can be sent to a port to set up or program a packet generator of the port to perform the memory read and write operations. The commands included in the script can include, e.g., data patterns, a maximum payload size, a maximum read request size, memory addresses of a memory of a server to which or from which the packet generator communicates read or write operations. The commands may also include initiating or starting the packet generator to program and begin executing the memory read and write operations.

An Environment for Testing PCIe Slots Using a Single PCIe Card

FIG. 1 illustrates a network environment 100 in which a single PCIe test card is used to test multiple PCIe slots, in accordance with an aspect of the present application. Environment 100 can include: a device 104, an associated user 106, and peripheral input/output (I/O) user devices 108 (e.g., a display 105, a keyboard 106, and a pointing device 107); a server 130 and a server 150; and a test card 120 and a test card 140. Device 104 and servers 130 and 150 can communicate with each other via a network 102.

Each server can include a plurality of slots (i.e., I/O slots or PCIe slots). For example, server 130 can include: a slot_1 133; a slot_2 134; a slot_3 135; and a slot_N 136. Similarly, server 150 can include: a slot_1 153; a slot_2 154; and a slot_N 155. Each test card can include a switch which includes a plurality of ports. For example, test card 120 can include a switch 122 which includes: a port_1 123; a port_2 124; a port_3 125; and a port_M 126. Similarly, test card 140 can include a switch 142 which includes: a port_1 143; a port_2 144; a port_3 145; and a port_M 146.

Furthermore, each port can include its own packet generator and a local private buffer, e.g., a volatile memory, which can store information associated with running a script or commands for testing purposes. For example, port_1 123 on switch 122 of test card 120 can include: a packet generator 110 which can be set up or programmed to perform, e.g., read and write operations; and a local private buffer 111, which can store script/commands 112. Script/commands 112 can include, e.g.: data patterns 113 indicating the read/write operations or the data to be written to memory; a maximum payload size 114; a maximum read request size 115; memory addresses 116 to or from which data is to be written or read; data to be written to a memory of the server 117 (also depicted as data patterns 113); and data read from a memory of the server 118.

A plurality of test ports of each card may be coupled to the plurality of I/O slots of the computing device. Given a number M=10 test ports on test card 120 and a number N=10 slots on server 130, each port on test card 120 can be coupled to a respective slot on server 130, leaving no port unused. Port_1 123 can be coupled to slot_1 133; port_2 124 can be coupled to slot_2 134; port_3 125 can be coupled to slot_3 135; and port_M 126 can be coupled to slot_N 136.

The number of ports on the test card may be the same or greater than the number of slots on the server. That is, one single test card can fully saturate all slots of the server, where either all ports are used or some ports remain unused. For example, given a number M=10 test ports on test card 140 and a number N=3 (where M is greater than N) slots on server 150, most (e.g., some but not all) of the ports on test card 140 can be coupled to a respective slot on server 150, leaving some ports unused, but achieving full saturation of the N slots on server 150 with a single test card (140). Port_1 143 can be coupled to slot_1 153; port_2 144 can be coupled to slot_2 154; and port_3 145 can be coupled to slot_N 155.

User 106, via peripheral I/O user devices 108, can use device 104 to operate server 130, e.g., to remotely control server 130 via network 102 as connected to server management software or a baseboard management controller (not shown) of server 130. Server 130 can be installed with a Universal Serial Bus (USB) drive 137 which can include a software test tool 138, such as a .efi file. During operation, user 106 can remotely power on server 130 by sending a command 160 to server 130. Upon receiving command 160, server 130 can boot the system (operation 162), e.g., to a Unified Extensible Firmware Interface (UEFI) shell, Windows, Linux, or other operating system, and user 106 can subsequently remotely execute the software test tool (e.g., the .efi file) by sending a command 164 to server 130. Upon receiving command 164, server 130 can run or execute the test tool (operation 166). For example, server 130 can execute the .efi file, search for or detect test card(s) (operation 168), and return an indicator of the detected test cards (as results 170).

Device 104 can receive results 170 and display corresponding information on display 105, similar to portions of screen 600 as depicted below in relation to FIG. 6A. User 106 can select a slot or slots on which to begin testing by sending a command 172 to server 130. Upon receiving command 172, server 130 can communicate with the ports via the slots (operation 174), e.g., to start testing on the port or ports coupled to or associated with the selected slot or slots by sending the script to test card 120. Test card 120 can program its packet generator 110 based on the script (operation 176 based on script/commands 112) and execute the script (operation 178 based on script/commands 112), e.g., by using the packets generated by packet generator 110 to perform the corresponding read and write operations.

Server 130 can monitor the results of the script run by each port (operation 180), in this case, script/commands 112 running on port_1 123. For example, server 130 can obtain a running count of a counter from packet generator 110 of port_1 123 and continue to send results 182 to device 104 to be displayed on display 105. Example screens as part of the user interface flow, including interactive user elements, are depicted below in relation to screens 600, 660, and 680 of, respectively, FIGS. 6A, 6B, and 6C.

User 106 can also send a command to server 130 to stop testing on a selected port (such as port_1 123), which can cause server 130 to send a corresponding command to port_1 123 to stop executing script/commands 112. While these communications are not explicitly labeled in FIG. 1, the communications may occur in a similar manner as described above for sending command 172 to start the testing on the selected port.

Furthermore, user 106 may configure or modify a script by modifying certain parameters associated with the script or commands, including adjusting the maximum payload size, the maximum read request size, and the memory addresses. For example, user 106 may modify script 112 for selected slot_1 123 and corresponding or coupled port_1 123 to adjust one of these parameters by sending a command 184 to server 130. Upon receiving command 130, server 130 can modify the script or commands (operation 186). In some aspects, server 130 can send a command to port_1 123 to stop running a test (if a test is currently running) and to modify script/commands 112 with the adjusted parameters. Port_1 123 may perform these modifications via its packet generator 110 working on script/commands 112 as stored in local private buffer 111 of port_1 123. In some aspects, device 104/server 130 may automatically modify the previously generated script based on a predetermined set of testing parameters. Testing of the PCIe slots on can be performed by fully saturating the slots of the server using the multiple ports of a single switch (i.e., a single test card).

While environment 100 depicts device 104 communicating with servers 130 and 150 via network 102, in some aspects, user 106 and peripheral I/O user devices 108 may be coupled to or associated with the servers. That is, device 104 and network 102 may be optional entities, such that the commands and results described above as originating from or ending at device 104 do not pass through a network and instead may be communicated directly by server 130 to user 106 and peripheral I/O devices 108.

Testing PCIe Slots Using Multiple PCIe Cards (Prior Art) Vs. A Single PCIe Card (Described Aspect)

Figure 2:
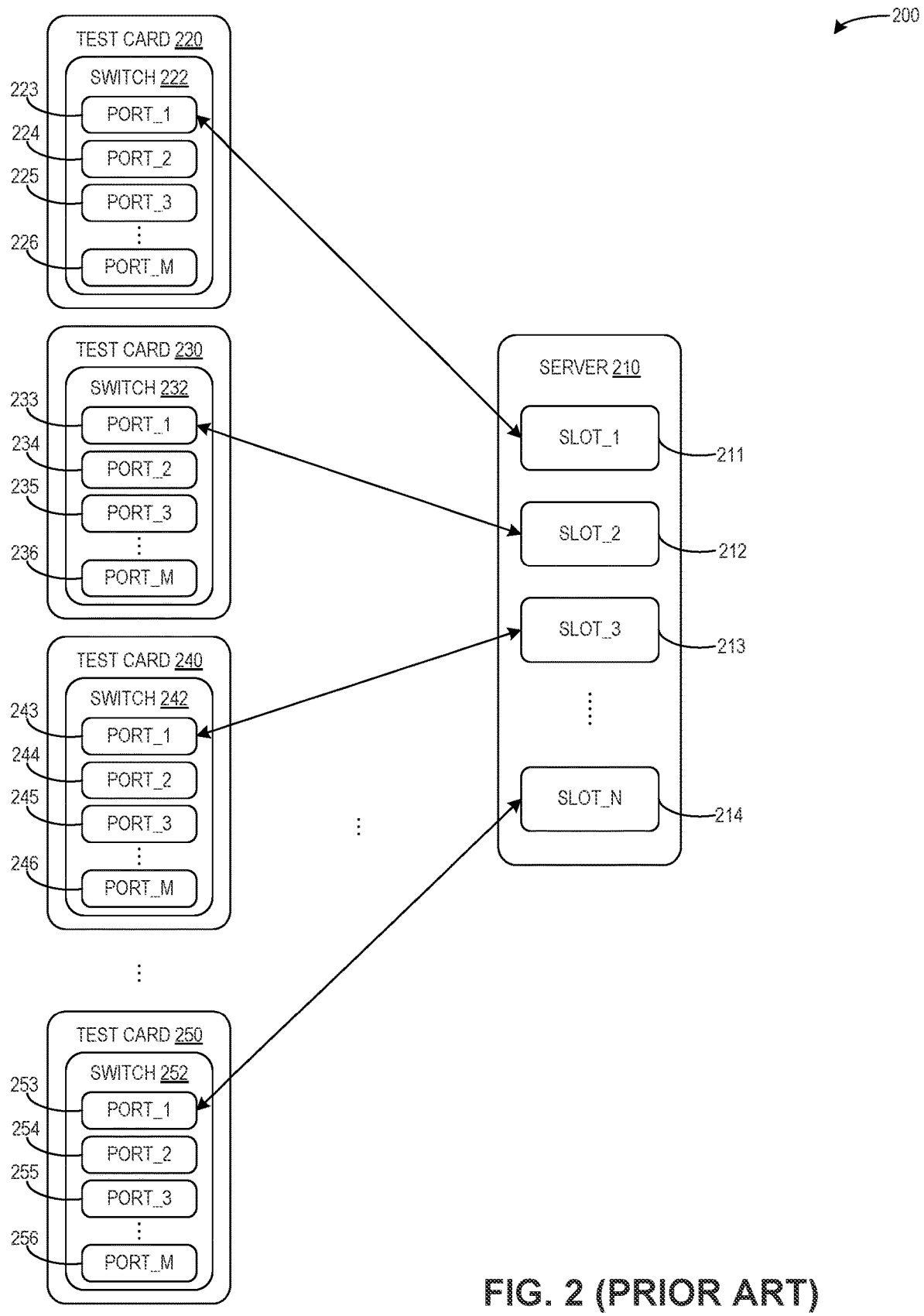
FIG. 2 illustrates an environment in which multiple PCIe test cards are used to test multiple PCIe slots, in accordance with the prior art.

FIG. 2 illustrates an environment 200 in which multiple PCIe test cards are used to test multiple PCIe slots, in accordance with the prior art. Environment 200 can include a server 210 and multiple test cards 220, 230, 240, and 250. Server 210 can include a plurality of slots (i.e., I/O slots or PCIe slots): a slot_1 211; a slot_2 212; a slot_3 213; and a slot_N 214. Each test card can include a switch which includes a plurality of ports. For example, test card 220 can include a switch 222 which includes: a port_1 223; a port_2 224; a port_3 225; and a port_M 226. Test card 230 can include a switch 232 which includes: a port_1 233; a port_2 234; a port_3 235; and a port_M 236. Test card 240 can include a switch 242 which includes: a port_1 243; a port_2 244; a port_3 245; and a port_M 246. Test card 250 can include a switch 252 which includes: a port_1 253; a port_2 254; a port_3 255; and a port_M 256.

A single test port of each card may be coupled to one of the plurality of I/O slots of the computing device. Given a number M=10 test ports on each of test cards 220-250 and a number N=10 slots on server 210, one port on each of test cards 220-250 can be coupled to a single slot on server 210, which leaves M−1=9 ports unused on each of test cards 220-250. Port_1 223 of test card 220 can be coupled to slot_1 211; port_1 233 of test card 230 can be coupled to slot_2 212; port_1 243 of test card 240 can be coupled to slot_3 213; and port_1 253 of test card 250 can be coupled to slot_N 214. While environment 200 depicts the first port of each test card coupled to the slots of server 210, any single port of a test card may be coupled to the slots of server 210.

Figure 3A:
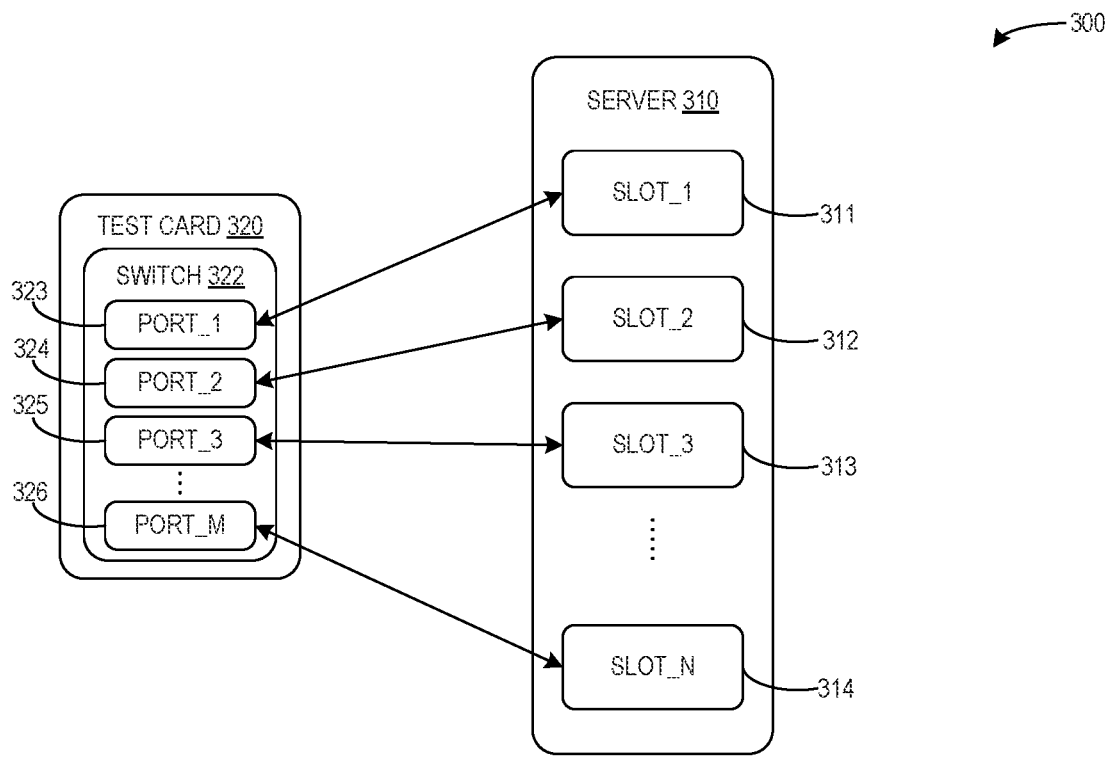
FIG. 3A illustrates an environment in which a single PCIe test card is used to saturate and test multiple PCIe slots, where the number of test ports is the same as the number of slots, in accordance with an aspect of the present application.

FIG. 3A illustrates an environment 300 in which a single PCIe test card is used to saturate and test multiple PCIe slots, where the number of test ports is the same as the number of slots, in accordance with an aspect of the present application. Environment 300 can include a server 310 and a test card 320. Server 310 can include a plurality of slots (i.e., I/O slots or PCIe slots): a slot_1 311; a slot_2 312; a slot_3 313; and a slot_N 314. Test card 320 can include a switch 322 which includes a plurality of ports: a port_1 323; a port_2 324; a port_3 325; and a port_M 326.

The plurality of test ports of test card 320 may be coupled to the plurality of I/O slots 311-314 of server 310. Given a number M=10 test ports on test card 320 and a number N=10 slots on server 310, each port on test card 320 can be coupled to a respective slot on server 310, leaving no port on test card 320 unused. Port_1 323 can be coupled to slot_1 311; port_2 324 can be coupled to slot_2 312; port_3 325 can be coupled to slot_3 313; and port_M 326 can be coupled to slot_N 314.

Figure 3B:
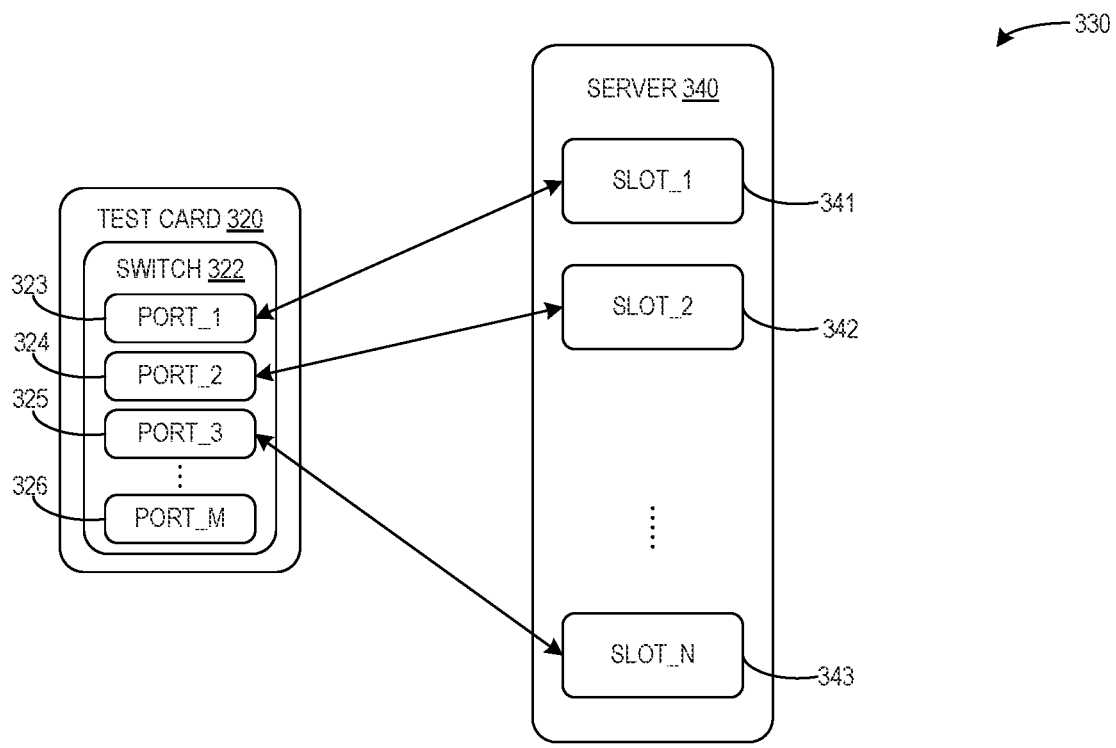
FIG. 3B illustrates an environment in which a single PCIe test card is used to saturate and test multiple PCIe slots, where the number of test ports is greater than the number of slots, in accordance with an aspect of the present application.

FIG. 3B illustrates an environment 330 in which a single PCIe test card is used to saturate and test multiple PCIe slots, where the number of test ports is greater than the number of slots, in accordance with an aspect of the present application. Environment 330 can include a server 340 and test card 320 (as in FIG. 3A). Server 340 can include a plurality of slots (i.e., I/O slots or PCIe slots): a slot_1 341; a slot_2 342; and a slot_N 343.

As described above in relation to FIG. 1, the number of ports on the test card may be the same or greater than the number of slots on the server. One single test card can fully saturate all slots of the server, where either all ports are used or some ports remain unused. For example, given a number M=10 test ports on test card 320 and a number N=3 (where M is greater than N) slots on server 340, most (e.g., some but not all) of the ports on test card 320 can be coupled to a respective slot on server 340, which leaves some ports unused, but can achieve full saturation of the N slots on server 340 with a single test card (320). Port_1 323 can be coupled to slot_1 341; port_2 324 can be coupled to slot_2 342; and port_3 325 can be coupled to slot_N 343.

Cable Configurations

Figure 4:
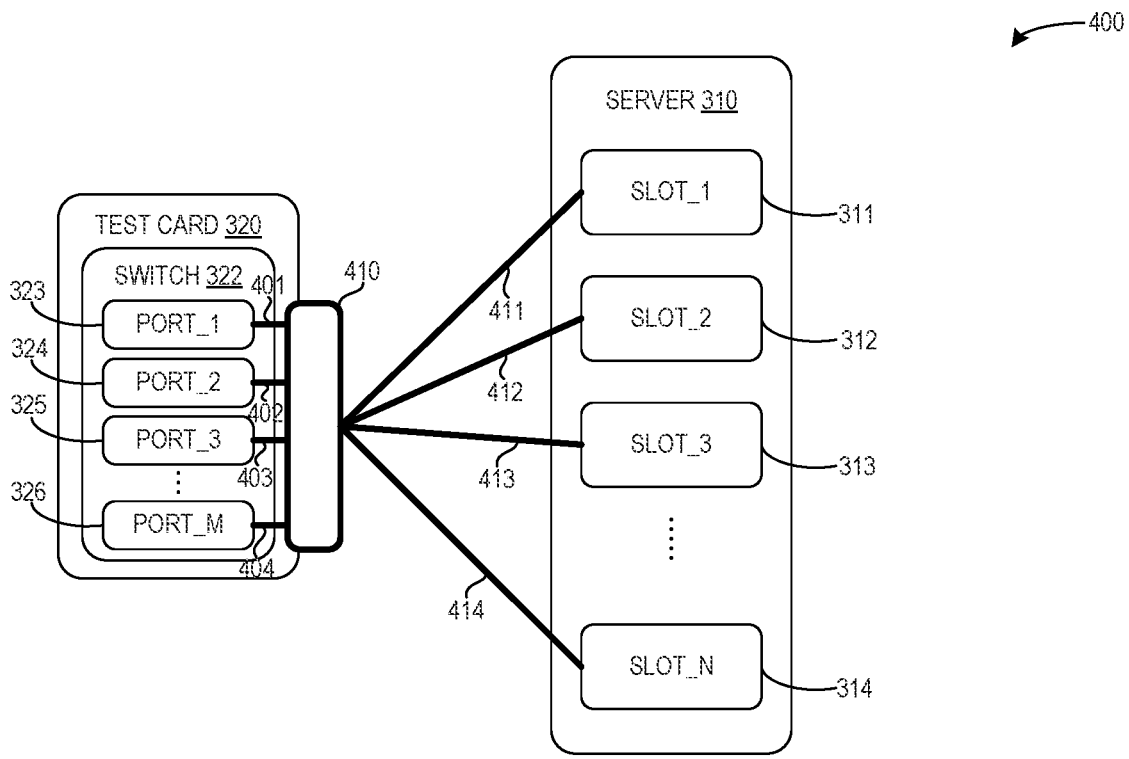
FIG. 4 illustrates a first cable configuration between the single PCIe test card and the multiple PCIe slots of FIG. 3A.

FIG. 4 illustrates a first cable configuration 400 between the single PCIe test card and the multiple PCIe slots of FIG. 3A. Cable configuration 400 can include a Y-type connector element 410. One side of connector element 410 can include connections to each of the test ports on test card 320 (e.g., connections 401, 402, 403, and 404 to, respectively, ports 323, 324, 325, and 326). The other side of connector element 410 can include a separate cable or cabled connection to each of the slots on server 310 (e.g., cables or cabled connections 411, 412, 413, and 414 to, respectively, slots 311, 312, 313, and 314). Cable configuration 400 can be designed, customized, or implemented such that cables 411-414 may be inserted directly into their respective corresponding slots 311-314.

The described aspects allow the software test tool to execute and begin testing on ports coupled to or associated with the selected slot or slots. For example, when slots 311-314 are selected, testing will begin by ports 323-326 by sending a script to test card 320. Test card 320 can program the packet generator of each of its respective ports based on the script. The script can be the same script or a different script. That is, the test tool may be programmed to execute or install the same or a different script on the multiple test ports to account for applications which may have different I/O patterns. For example, certain slots may be provided for applications associated with a greater number of read operations (such as accessing video files) may require testing based on more read than write operations or only read operations, while other slots may be provided for applications associated with a greater number of write operations (such as storing data files) may require testing based on more write than read operations or only write operations. These differing application requirements may result in executing or installing different scripts on each test port.

Figure 6A:
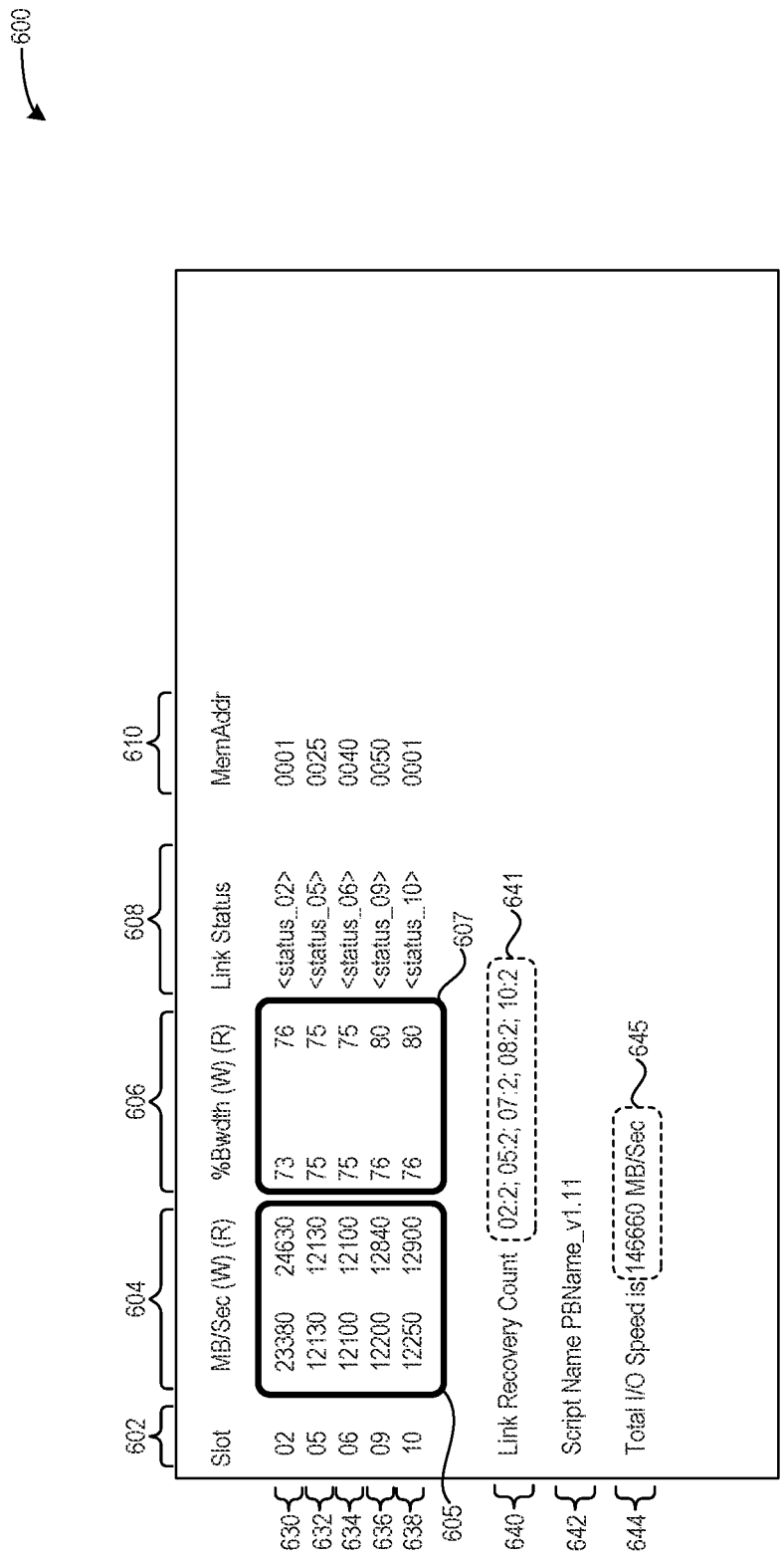
FIG. 6A presents a screen displayed as part of a user interface flow, in accordance with an aspect of the present application.
Figure 6C:
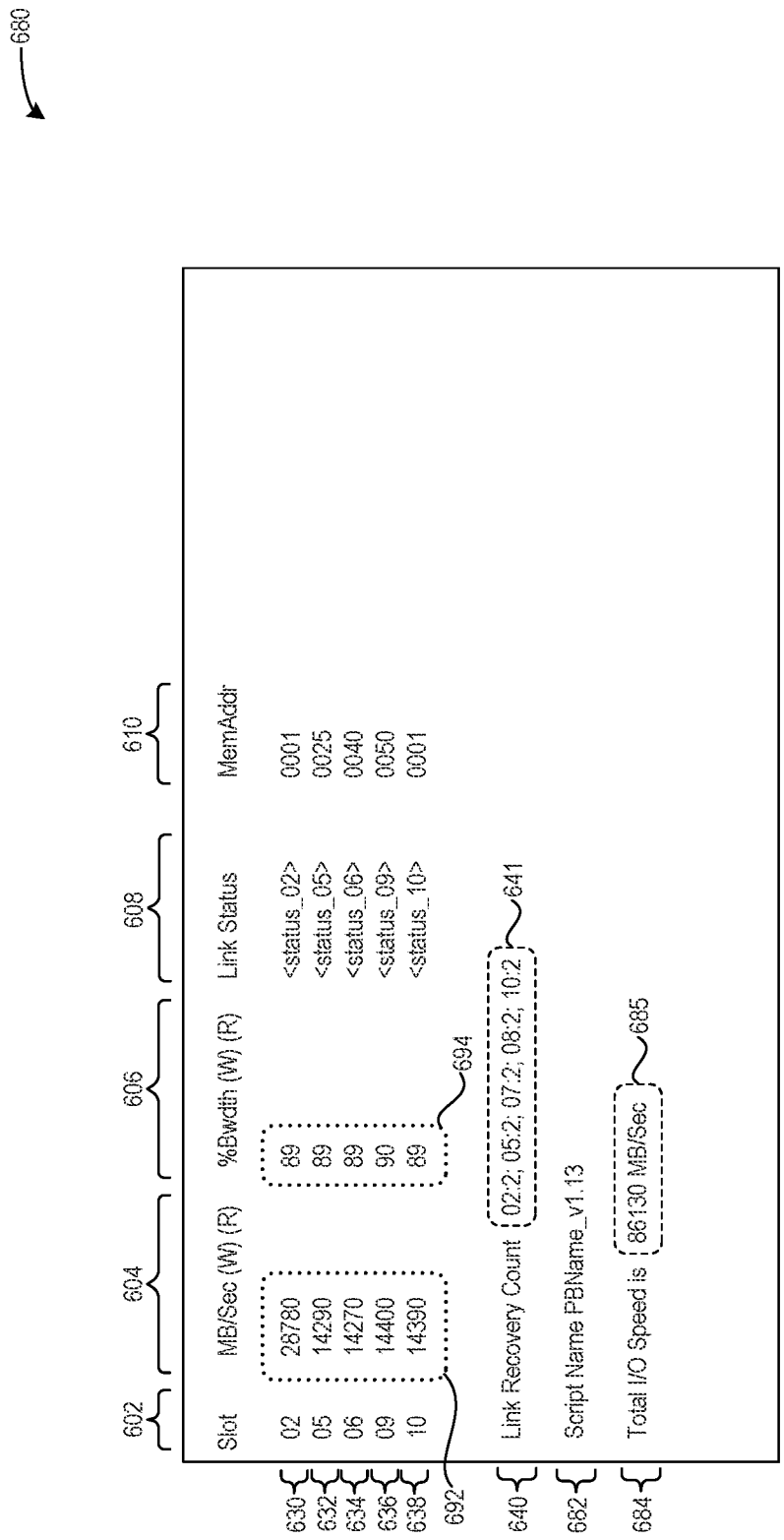
FIG. 6C presents a screen displayed as part of a user interface flow, in accordance with an aspect of the present application.

Similar to the monitoring described above in relation to server 130 of FIG. 1, server 310 can monitor the results of each (same or different) script run by each port and display the results as shown in FIGS. 6A, 6B, and 6C. The results may indicate the bandwidth saturation and the link health verification of a respective slot to which a test port is coupled, as described below in relation to the exemplary results displayed in FIG. 6A.

Figure 5:
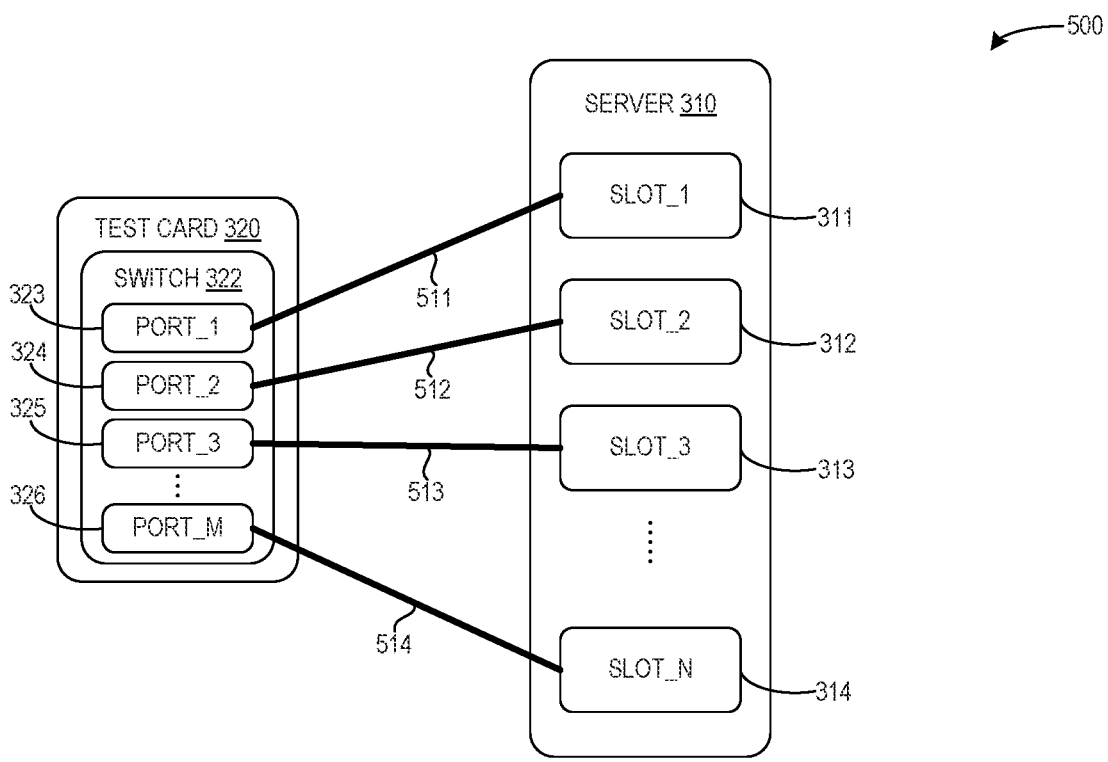
FIG. 5 illustrates a second cable configuration between the single PCIe test card and the multiple PCIe slots of FIG. 3A.

FIG. 5 illustrates a second cable configuration 500 between the single PCIe test card and the multiple PCIe slots of FIG. 3A. Cable configuration 500 can include separate cables or cabled connections from each of the ports on test card 320 to each of the slots on server 310 (e.g., cables or cabled connections 511, 512, 513, and 514 to, respectively, slots 311, 312, 313, and 314). Similar to cable configuration 400, cable configuration 500 can be designed, customized, or implemented such that cables 511-514 may be inserted directly into their respective corresponding slots 311-314.

User Interface Tools and Displayed Results

FIG. 6A presents a screen 600 displayed as part of a user interface flow, in accordance with an aspect of the present application. Screen 600 can include exemplary results from running scripts on a test card for multiple slots of a server, including scripts which perform simultaneous memory read and write operations, i.e., reading data from and writing data to a memory device associated with the server. The results can include information indicated by: a row 630 for slot 02; a row 632 for a slot 05; a row 634 for a slot 06; a row 636 for a slot 09; and a row 638 for a slot 10. The information for each row or slot can include: a slot number 602; Megabytes per second ("MB/Sec") for both write operations "(W)" and read operations "(R)" 604, which can indicate the unit of the current amount of data; the percentage bandwidth ("% Bdwdth") for write operations "(W)" and read operations "(R)" 606, which can indicate the ratio of the current amount of data and the maximum theoretical number; a link status 608, which can indicate, e.g., the trained speed and link widths of the PCIe test card, a maximum payload size, and a maximum read request size; and a memory address 610 ("MemAddr") which indicates an offset or is added to the memory address in the PCIe test card to or from which data is written or read.

An element 605 (bordered with a heavy bold line) indicates MB/Sec data corresponding to both write operations (W) and read operations (R). Similarly, an element 607 (also bordered with a heavy bold line) indicates % Bwdth data corresponding to both write operations (W) and read operations (R).

Screen 600 can also include a link recovery count 640, which can indicate the number of times that the PCIe test card enters a recovery mode. For example, element 641 can indicate this value for each slot as "<slot number>:<number of times that the PCIe test card enters recovery mode>," e.g., "02:2" indicates that slot 02 enters a recovery mode two times during the given testing cycle, period, interval, or script, "05:2" indicates that slot 05 enters a recovery mode two times during the given testing cycle, period, interval, or script, etc.

Screen 600 can also include a script name 642, which can include version information with a value of "PBName_v1.11." Screen 600 can further include a total I/O speed 644 with a value of 146660 MB/Sec (as indicated by an element 645). The value of element 645 can include a summation of all the numbers in column 604, for both write and read operations. While the script is running, or while a testing or test tool application on the computing device is running, the numbers under column 604 for MB/Sec and column 606 for percentage bandwidth may be constantly and dynamically updated. The exemplary results on screen 600 may correspond to a time which is a certain amount of time (e.g., in seconds or minutes) after initiating execution of the script. The test tool may run multiple scripts in a row, where each script may include: read operations and write operations (as depicted in the exemplary results of FIG. 6A); read operations only (as depicted in the exemplary results of FIG. 6B); or write operations only (as depicted in the exemplary results of FIG. 6C). The test tool may also be run to install the same or different scripts on the multiple ports of a detected test card. Furthermore, using the test tool described in FIG. 1, the user may modify the maximum read request size, the maximum payload size, and the memory addresses, and then remotely execute the test tool by sending an updated command to the given server. Operation may proceed as described above in relation to FIG. 1.

The user may subsequently view updated results based on the updated command, which results may be displayed similar to the exemplary results of FIGS. 6A, 6B, and 6C. The results can indicate a saturation of the bandwidth (e.g., the percentage bandwidth 606 which indicates the ratio of the current amount of data and the maximum theoretical number) as well as a verification of the link health, e.g., a health associated with the link or connection between the test card and a given slot. Several items in screen 600 can indicate the link health. Link status 608 can indicate the link health, e.g., a link status depicted as "<status_02>" for row 630 corresponding to slot 02 can indicate the speed and link widths of the test card, the maximum payload size, and the maximum read request size. Total I/O speed 644 may also indicate the link health (e.g., based on a certain expected threshold), and link recovery count 640 may also indicate the link health (e.g., based on an expected number of time that the test card enters recovery mode for a given slot). These expected numbers may be predetermined numbers or based on other predetermined thresholds for, e.g., the expected total I/O speed and the link recovery count.

FIG. 6B presents a screen 660 displayed as part of a user interface flow, in accordance with an aspect of the present application. Screen 660 can include exemplary results from running scripts on a test card for multiple slots of a server, including scripts which perform only memory read operations, i.e., reading data from a memory device associated with the server. The results can include information indicated by rows 630-638, similar to FIG. 6A. Elements 672 and 674 (bordered with a heavy alternating dot-dash line) can indicate, respectively: MB/Sec for read operations (R); and % Bwdth data corresponding to read operations (R).

Screen 660 can also include a script name 662, which can include version information with a value of "PBName_v1.12." Screen 660 can further include a total I/O speed 664 with a value of 76950 MB/Sec (as indicated by an element 665). The value of element 665 can include a summation of all the numbers in column 604, i.e., for the read operations.

FIG. 6C presents a screen displayed as part of a user interface flow, in accordance with an aspect of the present application. Screen 680 can include exemplary results from running scripts on a test card for multiple slots of a server, including scripts which perform only memory write operations, i.e., writing data to a memory device associated with the server. The results can include information indicated by rows 630-638, similar to FIG. 6A. Elements 692 and 694 (bordered with a dotted line) can indicate, respectively: MB/Sec for write operations (W); and % Bwdth data corresponding to write operations (W).

Screen 680 can also include a script name 682, which can include version information with a value of "PBName_v1.13." Screen 680 can further include a total I/O speed 684 with a value of 86130 MB/Sec (as indicated by an element 685). The value of element 685 can include a summation of all the numbers in column 604, i.e., for the write operations.

Method for Facilitating Saturation of Multiple PCIe Slots by Multiple Ports

Figure 7:
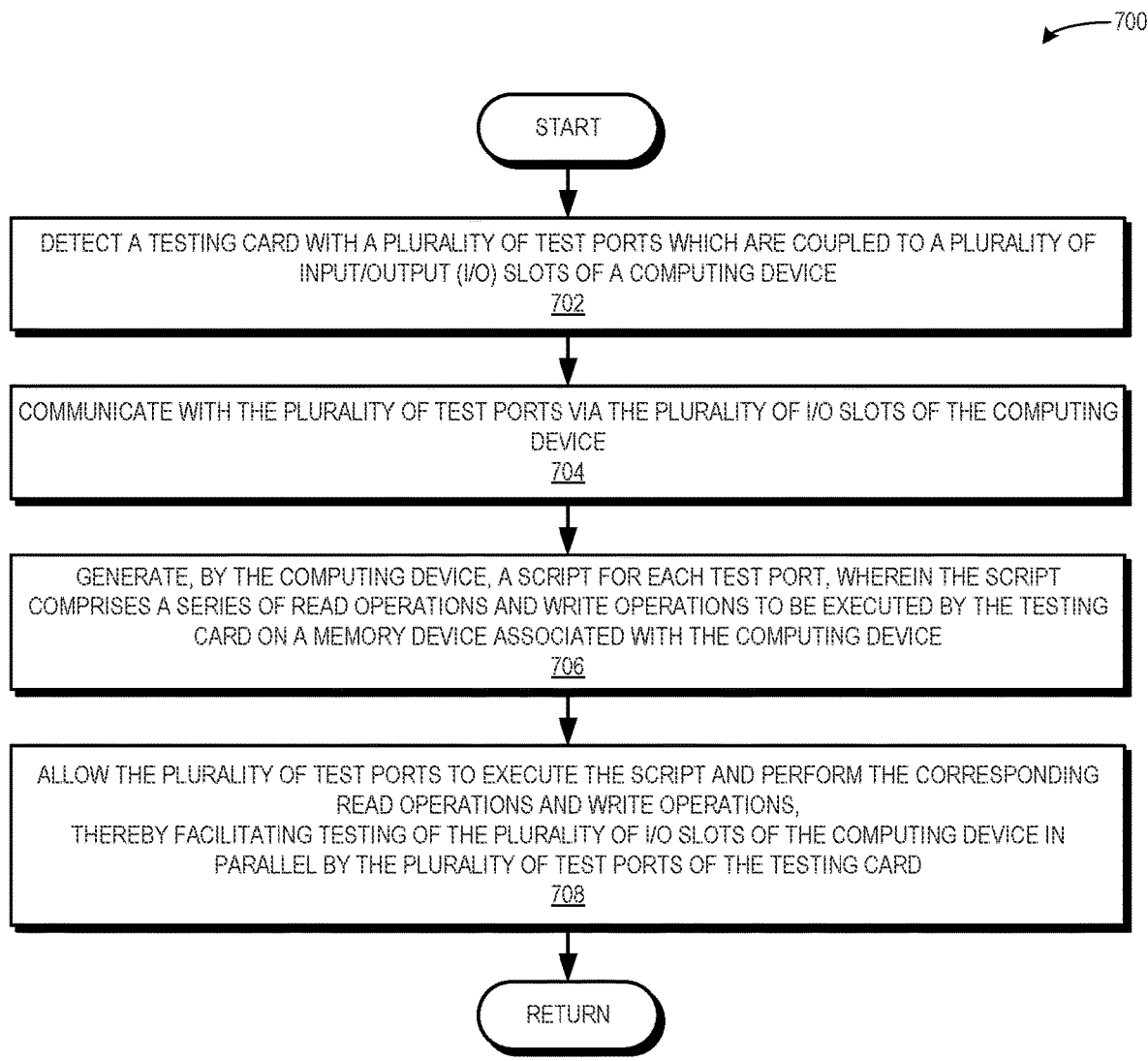
FIG. 7 presents a flowchart illustrating a method which facilitates saturation of multiple PCIe slots in a server by multiple ports in a single test card, in accordance with an aspect of the present application.

FIG. 7 presents a flowchart illustrating a method 700 which facilitates saturation of multiple PCIe slots in a server by multiple ports in a single test card, in accordance with an aspect of the present application. During operation, the system detects a testing card with a plurality of test ports which are coupled to a plurality of input/output (I/O) slots of a computing device (operation 702). The system communicates with the plurality of test ports via the plurality of I/O slots of the computing device (operation 704). The system generates, by the computing device, a script for each test port, wherein the script comprises a series of read operations and write operations to be executed by the testing card on a memory device associated with the computing device (operation 706). The system allows the plurality of test ports to execute the script and perform the corresponding read operations and write operations, thereby facilitating testing of the plurality of I/O slots of the computing device in parallel by the plurality of test ports of the testing card (operation 708).

In general, the disclosed aspects provide a method and system for saturation of multiple PCIe slots in a server by multiple ports in a single switch. In one aspect of the present application, the system detects a testing card with a plurality of test ports which are coupled to a plurality of input/output (I/O) slots of a computing device. The system communicates with the plurality of test ports via the plurality of I/O slots of the computing device. The system generates, by the computing device, a script for each test port, wherein the script comprises a series of read operations and write operations to be executed by the testing card on a memory device associated with the computing device. The system allows the plurality of test ports to execute the script and perform the corresponding read operations and write operations, thereby facilitating testing of the plurality of I/O slots of the computing device in parallel by the plurality of test ports of the testing card.

In a variation on this aspect, the plurality of test ports and the plurality of I/O slots are coupled using a first cable with a Y-type connector from the testing card to a first plurality of cables and cable connectors for each of the plurality of I/O slots on the computing device.

In a further variation, the plurality of test ports and the plurality of I/O slots are coupled using a second cable with a second plurality of cable connectors from the testing card to a third plurality of cables and cable connectors for each of the plurality of I/O slots on the computing device.

In a further variation, the testing card is a Peripheral Component Interconnect Express (PCIe) testing card, and the I/O slots of the computing device comprise PCIe slots of the computing device.

In a further variation, a first number of the plurality of test ports is greater than or equal to a second number of the plurality of I/O slots.

In a further variation, the testing card comprises a switch which includes the plurality of test ports.

In a further variation, the series of read operations and write operations indicated by the script for a respective test port are to saturate a bandwidth and verify link health of a respective I/O slot to which the respective test port is coupled.

In a further variation, wherein prior to allowing the plurality of test ports to execute the script and perform the corresponding read operations and write operations, the system installs the script or a different script on each of the plurality of test ports and performs at least one of: the corresponding read operations; and the corresponding write operations.

In a further variation, installing the script comprises storing, by a respective test port in a volatile memory of the respective test port, at least one of: memory addresses associated with the memory device, wherein a respective memory address is associated with one of the read operations and the write operations; data associated with the read operations and the write operations; and a data pattern which indicates the series of read operations and write operations.

In a further variation, installing the script on each of the plurality of test ports is responsive to a user generating a command to install the script on the plurality of test ports, and the user is associated with the computing device or another computing entity.

In a further variation, subsequent to allowing the plurality of test ports to execute the script and perform the corresponding read and write operations, the system perform the following operations. The system displays, on a display screen of the computing device or the other computing entity, results of the plurality of test ports executing the script and performing the corresponding read and write operations. The system modifies, via the display screen by the user based on the displayed results, the script to comprise a modified series of read operations and write operations. The system transmits the modified script to the plurality of test ports. The system allows the plurality of test ports to execute the modified script and perform the corresponding read operations and write operations, thereby facilitating further testing of the plurality of I/O slots of the computing device in parallel by the plurality of test ports of the testing card.

In another aspect of the present application, a computer system comprises a processor and a memory coupled to the processor and storing instructions which, when loaded to a test card by the processor, cause the test card to perform a method, the method as described above.

In yet another aspect of the present application, an apparatus comprises: a testing card with a plurality of test ports; a computing device with a plurality of PCIe slots. The plurality of test ports of the testing card are coupled to the plurality of PCIe slots of the computing device. The computing device is to generate a script for each test port of the plurality of test ports. The script indicates a series of read operations and write operations to be performed by the testing card on a non-volatile memory associated with the computing device. A respective test port, in parallel with a remainder of the test ports, is to run the script by executing the series of read operations and write operations indicated by the script, thereby allowing saturation of the plurality of PCIe slots of the computing device by the plurality of test ports of the testing card.

The foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A computer-implemented method, comprising:
   detecting a testing card with a plurality of test ports which are coupled to a plurality of input/output (I/O) slots of a computing device;
   communicating with the plurality of test ports via the plurality of I/O slots of the computing device;
   generating, by the computing device, a script for each test port, wherein the script comprises a series of read operations and write operations to be executed by the testing card on a memory device associated with the computing device; and
   allowing the plurality of test ports to execute the script and perform the corresponding read operations and write operations,
   thereby facilitating testing of the plurality of I/O slots of the computing device in parallel by the plurality of test ports of the testing card; and
   modifying the script, wherein modifying the script comprises modifying, by a user via a display screen of the computing device or another computing entity, the script by adjusting parameters including at least one of a maximum payload size, a maximum read request size, and memory addresses associated with the read and write operations.

2. The method of claim 1,
   wherein the plurality of test ports and the plurality of I/O slots are coupled using a first cable with a Y-type connector from the testing card to a first plurality of cables and cable connectors for each of the plurality of I/O slots on the computing device.

3. The method of claim 1,
   wherein the plurality of test ports and the plurality of I/O slots are coupled using a first cable with a first plurality of cable connectors from the testing card to a second plurality of cables and cable connectors for each of the plurality of I/O slots on the computing device.

4. The method of claim 1,
   wherein the testing card is a Peripheral Component Interconnect Express (PCIe) testing card, and
   wherein the I/O slots of the computing device comprise PCIe slots of the computing device.

5. The method of claim 1,
   wherein a first number of the plurality of test ports is greater than or equal to a second number of the plurality of I/O slots.

6. The method of claim 1,
   wherein the testing card comprises a switch which includes the plurality of test ports.

7. The method of claim 1,
   wherein the series of read operations and write operations indicated by the script for a respective test port are to saturate a bandwidth and verify link health of a respective I/O slot to which the respective test port is coupled.

8. The method of claim 1, wherein prior to allowing the plurality of test ports to execute the script and perform the corresponding read operations and write operations, the method further comprises:
   installing the script or different scripts on each of the plurality of test ports; and
   performing at least one of: the corresponding read operations; and the corresponding write operations.

9. The method of claim 8, wherein installing the script comprises storing, by a respective test port in a volatile memory of the respective test port, at least one of:
   memory addresses associated with the memory device, wherein a respective memory address is associated with one of the read operations and the write operations;
   data associated with the read operations and the write operations; and
   a data pattern which indicates the series of read operations and write operations.

10. The method of claim 8,
    wherein installing the script on each of the plurality of test ports is responsive to a user generating a command to install the script on the plurality of test ports, and
    wherein the user is associated with the computing device or another computing entity.

11. The method of claim 10, wherein subsequent to allowing the plurality of test ports to execute the script and perform the corresponding read and write operations, the method further comprises:
    displaying, on the display screen of the computing device or the other computing entity, results of the plurality of test ports executing the script and performing the corresponding read and write operations;
    wherein modifying the script further comprises at least one of:
       modifying, by the user via the display screen, certain parameters associated with the script; or
       modifying, automatically by the computing device, the script based on a predetermined set of testing parameters; and
    responsive to modifying the script:
       transmitting the modified script to the plurality of test ports; and
       allowing the plurality of test ports to execute the modified script and perform the corresponding read operations and write operations based on at least one of the adjusted parameters or the predetermined set of testing parameters,
       thereby facilitating further testing of the plurality of I/O slots of the computing device in parallel by the plurality of test ports of the testing card.

12. A computer system, comprising:
    a processor; and
    a memory coupled to the processor and storing instructions which, when executed by the processor, cause the processor to perform a method, the method comprising:
       detecting a testing card with a plurality of test ports which are coupled to a plurality of input/output (I/O) slots of a computing device;
       communicating with the plurality of test ports via the plurality of I/O slots;
       generating, by the computing device, a script for each test port, wherein the script comprises a data pattern including read operations and write operations to be executed by the testing card on a memory device associated with the computing device;
       allowing the plurality of test ports to execute the script and perform the corresponding read operations and write operations included in the data pattern,
       thereby facilitating testing of the plurality of I/O slots of the computing device in parallel by the plurality of test ports of the testing card; and
       modifying the script, wherein modifying the script comprises modifying, by a user via a display screen of the computing device or another computing entity, the script by adjusting parameters including at least one of a maximum payload size, a maximum read request size, and memory addresses associated with the read and write operations.

13. The computer system of claim 12, wherein the plurality of test ports and the plurality of I/O slots are coupled using at least one of:
 a first cable with a Y-type connector from the testing card to a first plurality of cables and cable connectors for each of the plurality of I/O slots on the computing device; and
 a second cable with a second plurality of cable connectors from the testing card to a third plurality of cables and cable connectors for each of the plurality of I/O slots on the computing device.

14. The computer system of claim 12,
 wherein the testing card is a Peripheral Component Interconnect Express (PCIe) testing card, and
 wherein the I/O slots of the computing device comprise PCIe slots of the computing device.

15. The computer system of claim 12,
 wherein the data pattern, including the read operations and write operations to be executed by the testing card, comprised by the script for a respective test port is to saturate a bandwidth and verify link health of a respective I/O slot to which the respective test port is coupled.

16. The computer system of claim 12, wherein prior to allowing the plurality of test ports to execute the script and perform the corresponding read operations and write operations included in the data pattern, the method further comprises:
 installing the script or a different script on each of the plurality of test ports; and
 performing at least one of: the corresponding read operations; and the corresponding write operations.

17. The computer system of claim 16, wherein installing the script comprises storing, by a respective test port in a volatile memory of the respective test port, at least one of:
 memory addresses associated with the memory device, wherein a respective memory address is associated with one of the read operations and the write operations;
 data associated with the read operations and the write operations; and
 a data pattern which indicates the series of read operations and write operations.

18. The computer system of claim 16,
 wherein installing the script on each of the plurality of test ports is responsive to a user generating a command to install the script on the plurality of test ports, and
 wherein the user is associated with the computing device or another computing entity.

19. The computer system of claim 18, wherein subsequent to allowing the plurality of test ports to execute the script and perform the corresponding read and write operations, the method further comprises:
 displaying, on the display screen of the computing device or the other computing entity, results of the plurality of test ports executing the script and performing the corresponding read and write operations;
 wherein modifying the script further comprises at least one of:
  modifying, by the user via the display screen, certain parameters associated with the script; or
  modifying, automatically by the computing device, the script based on a predetermined set of testing parameters; and
 responsive to modifying the script:
  transmitting the modified script to the plurality of test ports; and
  allowing the plurality of test ports to execute the modified script and perform the corresponding read operations and write operations based on at least one of the adjusted parameters or the predetermined set of testing parameters,
  thereby facilitating further testing of the plurality of I/O slots of the computing device in parallel by the plurality of test ports of the testing card.

20. An apparatus, comprising:
 a testing card with a plurality of test ports;
 a computing device with a plurality of PCIe slots,
 wherein the plurality of test ports of the testing card are coupled to the plurality of PCIe slots of the computing device;
 wherein the computing device is to generate a script for each test port of the plurality of test ports,
 wherein the script indicates a series of read operations and write operations to be performed by the testing card on a non-volatile memory associated with the computing device;
 wherein a respective test port, in parallel with a remainder of the test ports, is to run the script by executing the series of read operations and write operations indicated by the script,
 thereby allowing saturation of a bandwidth and verification of link health of the plurality of PCIe slots of the computing device by the plurality of test ports of the testing card; and
 wherein the computing device is associated with a display screen via which a user is to modify the script by adjusting parameters including at least one of a maximum payload size, a maximum read request size, and memory addresses associated with the read and write operations.

* * * * *